United States Patent
Smith

(10) Patent No.: US 9,804,413 B2
(45) Date of Patent: Oct. 31, 2017

(54) ONE STEM REVERSIBLE READING GLASSES

(71) Applicant: Sandra W. Smith, Knoxville, TN (US)

(72) Inventor: Sandra W. Smith, Knoxville, TN (US)

( * ) Notice: Subject to any disclaimer, the term of this patent is extended or adjusted under 35 U.S.C. 154(b) by 93 days.

(21) Appl. No.: 14/487,343

(22) Filed: Sep. 16, 2014

(65) Prior Publication Data

US 2015/0092153 A1    Apr. 2, 2015

Related U.S. Application Data

(60) Provisional application No. 61/884,200, filed on Sep. 30, 2013.

(51) Int. Cl.
| | |
|---|---|
| *G02C 5/20* | (2006.01) |
| *G02C 5/14* | (2006.01) |
| *G02C 5/12* | (2006.01) |
| *G02C 5/00* | (2006.01) |

(52) U.S. Cl.
CPC ............. *G02C 5/143* (2013.01); *G02C 5/001* (2013.01); *G02C 5/12* (2013.01); *G02C 5/20* (2013.01); *G02C 2200/08* (2013.01)

(58) Field of Classification Search
CPC .... G02C 11/02; G02C 2200/08; G02C 5/143; G02C 5/126; G02C 3/003; G02C 5/04; G02C 5/12; G02C 2027/0178; G02C 5/14; G02C 5/16; G02C 5/2209; G02C 3/006; G02C 5/001; G02B 2027/0178; B29D 12/02
USPC .............................. 351/158, 111, 41, 52, 115
See application file for complete search history.

(56) References Cited

U.S. PATENT DOCUMENTS

| | | | |
|---|---|---|---|
| 862,124 A | 8/1907 | Allan | |
| 4,564,272 A * | 1/1986 | Rinnooy Kan | G02C 5/10 16/228 |
| 4,750,828 A * | 6/1988 | Sartor | G02C 5/16 16/228 |
| 4,787,731 A | 11/1988 | Rogers | |
| 4,799,782 A | 1/1989 | Tuttle | |
| 4,840,476 A | 6/1989 | Rooney | |
| 5,007,728 A | 4/1991 | Magorien | |
| 5,579,062 A * | 11/1996 | Sondrol | G02C 1/08 351/140 |
| 5,929,966 A | 7/1999 | Conner | |
| 6,705,720 B2 | 3/2004 | Brown et al. | |

(Continued)

FOREIGN PATENT DOCUMENTS

| | | |
|---|---|---|
| EP | 1535103 | 6/2005 |
| WO | 2008052124 A2 | 5/2008 |

*Primary Examiner* — Ricky Mack
*Assistant Examiner* — Daniele Manikeu
(74) *Attorney, Agent, or Firm* — Luedeka Neely Group, PC

(57) ABSTRACT

One stem reversible glasses include a first lens and a second lens. A stem having a proximal end and a distal end is connected adjacent one of the first lens and the second lens at the proximal end. An earpiece is connected adjacent the distal end of the stem, the earpiece including means for securing the earpiece to a right ear of a user when the glasses are in a first reading position and for securing the earpiece to a left ear of the user when the glasses are in a second reading position. A nosepiece is disposed between the first lens and the second lens dimensioned and configured for receiving a nose of a user when the glasses are in either the first reading position or the second reading position.

11 Claims, 3 Drawing Sheets

(56) References Cited

U.S. PATENT DOCUMENTS

| | | |
|---|---|---|
| 6,935,740 B1 | 8/2005 | Chang |
| 7,637,610 B2 | 12/2009 | Graffia |
| 7,845,794 B1 | 12/2010 | Chuo |
| 7,905,591 B2 | 3/2011 | Strobel |
| 8,210,676 B1 | 7/2012 | Hunt |
| 2003/0038919 A1 | 2/2003 | Lin |
| 2004/0130674 A1* | 7/2004 | Epstein .................. G02C 5/005 351/115 |
| 2010/0073625 A1 | 3/2010 | Engstrom |
| 2010/0073626 A1 | 3/2010 | Engstrom |
| 2011/0228210 A1 | 9/2011 | Willett |
| 2011/0249231 A1 | 10/2011 | Hou |
| 2012/0008086 A1* | 1/2012 | Roseillier .............. G02C 5/001 351/114 |

\* cited by examiner

ONE STEM REVERSIBLE READING GLASSES

CROSS-REFERENCE TO RELATED APPLICATION

This application claims priority to U.S. Provisional Application Ser. No. 61/884,200 filed Sep. 30, 2013, and entitled "Reversible Reading Glasses For Use While Lying Down On One's Side," the contents of which are incorporated by reference herein in its entirety.

FIELD

This invention relates to the field of reading glasses. More particularly, this invention relates to reading glasses that permit a user to comfortably wear the glasses while lying on one's side.

BACKGROUND

Many people like to lie on one's side while reading or watching television. However, for people that need to wear glasses in order to read or see the television, the glasses make lying on one's side very uncomfortable. In particular, current reading glasses have two stems, which makes it virtually impossible to perform certain activities while lying down on one's side that require glasses, such as reading or watching television. In particular, lying on a stem is uncomfortable as it causes ear and head pain. Further, lying down on the stem causes the glasses to move askew so that the glasses are no longer in place and, therefore, unusable.

Accordingly, what is needed is a pair of glasses that permit a user to comfortably wear glasses while lying on one's side and prevents movement of the glasses with respect to the user's eyes while lying on one's side.

SUMMARY OF THE INVENTION

According to one embodiment of the disclosure, one stem reversible glasses are provided including a first lens and a second lens. A stem having a proximal end and a distal end is connected adjacent one of the first lens and the second lens at the proximal end. An earpiece is connected adjacent the distal end of the stem, the earpiece including means for securing the earpiece to a right ear of a user when the glasses are in a first reading position and for securing the earpiece to a left ear of the user when the glasses are in a second reading position. A nosepiece is disposed between the first lens and the second lens dimensioned and configured for receiving a nose of a user when the glasses are in either the first reading position or the second reading position.

In certain embodiments, the earpiece includes a first ear member and a second ear member both extending at least slightly vertically with respect to the stem in opposite directions whereby the first ear member is dimensioned and configured for securing the earpiece to the right ear of the user when the glasses are in the first reading position and the second ear member is dimensioned and configured for securing the earpiece to the left ear of the user when the glasses are in the second reading position.

According to other embodiments, the earpiece includes a vertical member extending at least slightly vertically with respect to the stem and a rotating mechanism operable to move the vertical member between a first position for securing the vertical member to the right ear of the user when the glasses are in the first reading position and a second position for securing the vertical member to the left ear of the user when the glasses are in the second reading position.

According to some embodiments, the nosepiece includes a cross member disposed a substantially equal distance between a first end and a second end of the first and second lenses. The nosepiece may further include a set of nose pads positioned with respect to the cross member such that the nose pads receive and cushion the nose of the user in both the first and second reading positions. According to other embodiments, the nosepiece includes a first set and a second set of nose pads positioned such that the first set of nose pads are positioned adjacent a first end of the first and second lenses for receiving and cushioning the nose of the user in the first reading position and the second set of nose pads are positioned adjacent a second end of the first and second lenses for receiving and cushioning the nose of the user in the second reading position.

In certain embodiments, the one-stem glasses include a second stem, wherein at least one of the stems is operable to be removed or positioned such that the stem does not extend along the side of a user's face.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIG. 1B illustrates a rear perspective view of the pair of reversible glasses of FIG. 1A in the second reading position;

DETAILED DESCRIPTION

Figure 1A:
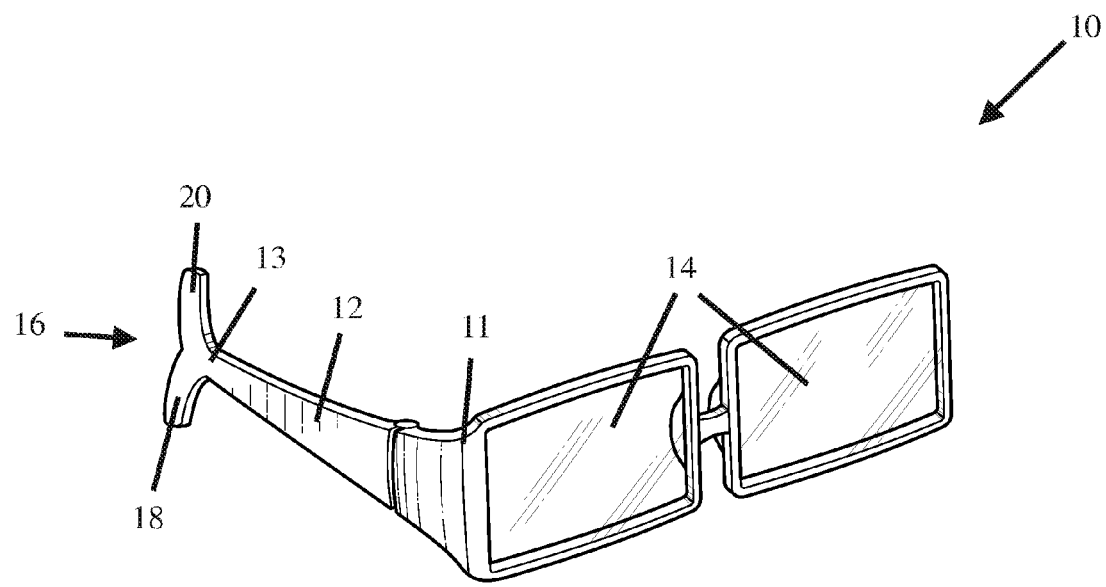
FIG. 1A illustrates a front perspective view of a pair of reversible glasses in a first reading position according to one embodiment of the disclosure.

Referring to FIGS. 1A-1D, the glasses 10 of the present disclosure preferably include only one stem 12. While the present disclosure is particularly well-suited to reading glasses because they are relatively inexpensive, it should be understood that the same concept could be used for any other type of glasses known in the art such as prescription glasses for near-sighted people, bifocals for both near and far sighted impairments, sunglasses, etc. It should also be understood that the glasses 10 of the present disclosure are not limited to any particular shape, construction, materials, or colors. For example, while shown in the drawings herein as having rims, the glasses 10 are preferably rimless. Additionally, the lenses 14 are preferably composed of a material such as Trivex® or polycarbonate, which are impact and scratch resistant, but other less expensive materials may also be used.

As noted above, the glasses 10 preferably include one stem 12. The stem 12 includes a proximal end 11 and a distal end 13. The stem is connected adjacent one of lenses 14 at the proximal end 11 and includes an earpiece 16 at the distal end 13. By providing only one stem 12, the glasses 10 are configured such that they are comfortable to wear while lying down on one's side when, for example, watching television or reading a book. In this regard, the one stem 12 and associated earpiece 16 is operable to extend along the side of a user's face that faces upward while lying down on one's side. As such, the present glasses 10 are much more comfortable as compared to existing glasses with two stems because the user's head is not pressing against the second stem that typically is disposed between the user's head and the surface in which the user is lying on top of such as a pillow, mattress, or couch.

Figure 1B:
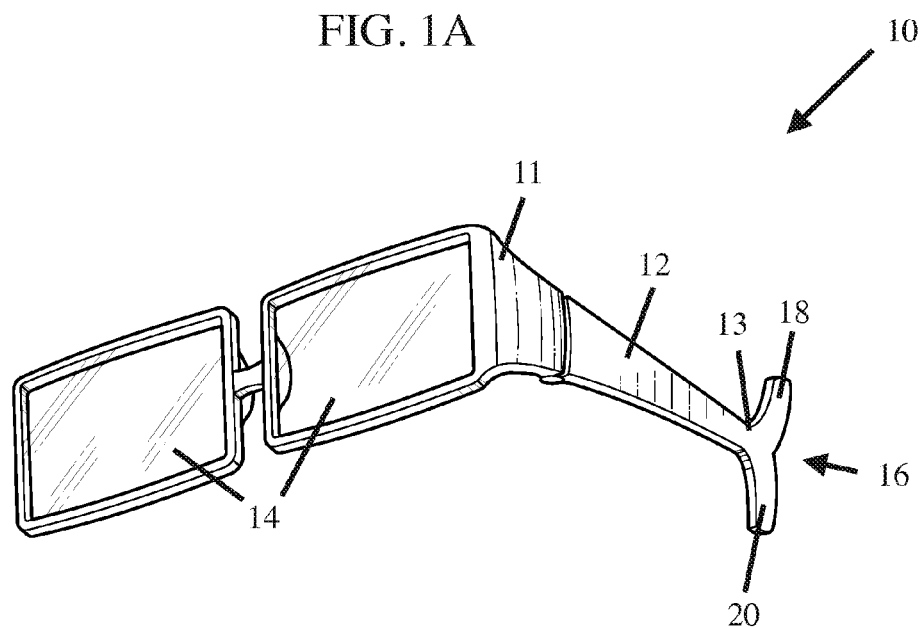
FIG. 1B illustrates a front perspective view of the pair of reversible glasses of FIG. 1A in a second reading position.

In preferred embodiments, the one-stem glasses 10 are easily reversible/flippable such that they can be comfortably worn when the user rolls over and the opposite ear is then facing upward. In doing so, the user simply removes the glasses 10 and rotates them 180° such that the stem 12 would then be aligned with the opposite side of the user's face. In order to securely wear the glasses around either ear, the earpiece 16 of stem 12 includes means for securing to either ear depending on which position the glasses 10 are worn. For example, referring to FIGS. 1A-1B, the earpiece 16 includes a first ear member 18 and a second ear member 20 both extending at least slightly vertically with respect to the stem 12. In other words, the first ear member 18 and second ear member 20 are dimensioned and configured with respect to the stem 12 such that the appropriate ear member is operable to at least partially wrap around one of the user's ear to secure the glasses 10 to the user's head in either a first reading position or a second reading position. In the first reading position, as shown in FIG. 1A, the first ear member 18 is operable to be positioned behind the user's right ear for securing the glasses 10 to the user's right side of their head while the user lays on their left side. Then, when the glasses 10 are rotated to the second reading position, as shown in FIG. 1B, such that the stem 12 is positioned along the left side of the user's head while laying on their right side, the second ear member 20 is operable to be positioned behind the user's left ear for securing the glasses 10 to the user.

While the terms "first reading position" and "second reading position" are used herein to refer to the positions in which the glasses may be worn as described above (i.e., stem of the glasses extending from the lenses 14 towards the user's right ear in the first reading position and extending towards the user's left ear in the second reading position), it should be understood that any other activity besides reading could be performed while wearing the glasses, such as watching television, using a tablet computer, etc. For example, it is also foreseen that the glasses would be used in nursing homes where patients are immobile or bedridden. While the glasses may be used to watch television or read, the nursing home patient may also use the glasses simply to view visitors from a more comfortable side position.

Figure 2A:
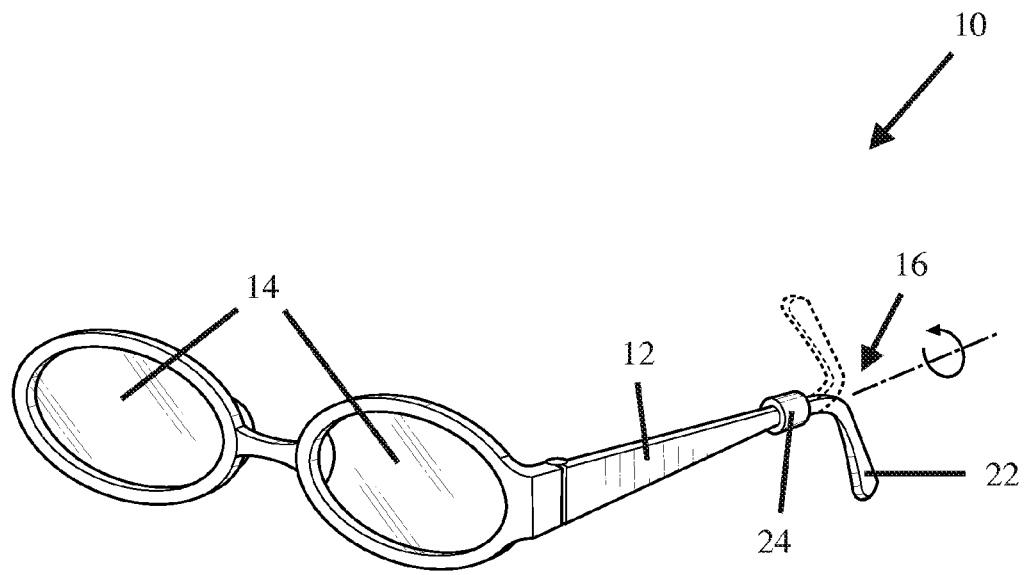
FIG. 2A illustrates a front perspective view of a pair of reversible glasses in a first reading position according to another embodiment of the disclosure.
Figure 2B:
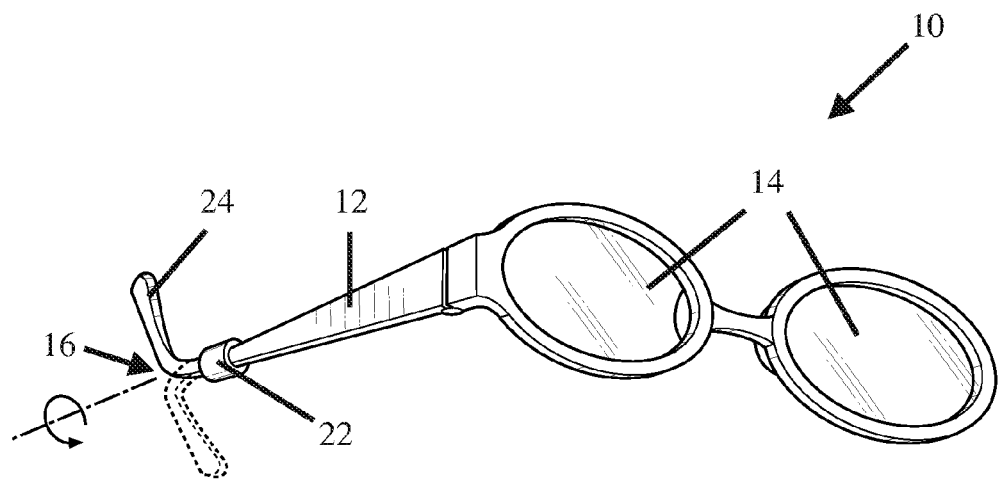
FIG. 2B illustrates a front perspective view of the pair of reversible glasses of FIG. 2A in a second reading position.

Other means for the reversible earpiece 16 (i.e., the ear piece being dimensioned and configured for securing to either ear depending on which position the glasses 10 are used) are contemplated and within the scope of the present disclosure. For example, referring to FIGS. 2A-2B, the reversible earpiece 16 may include a single vertical member 22 and a rotating mechanism 24 configured to permit the wearer to rotate the single vertical member 22 to the first reading position (as indicated by solid lines for the vertical member 22) or the second reading position (as indicated by dashed lines). It should be understood that the rotating mechanism 24 may be any rotating attachment mechanism known in the art for securing the earpiece 16 to the stem 12 such as ratchets, screws, tongue and groove attachment, etc. Further, while the rotating mechanism 24 preferably provides a permanent attachment between the stem 12 and the earpiece 16, it should be understood that the rotating mechanism 24 may also permit the earpiece to be removed, rotated, and then secured back to the stem 12 to change positions. For example, the earpiece 16 may include an end sized and configured to removeably snap into an aperture in the stem 12. Additionally, particularly when a tongue and groove attachment is used, it should be understood that the earpiece 16 might be slid up and down as opposed to rotated to move the single vertical member 22 between the first and second reading positions.

Figure 1C:
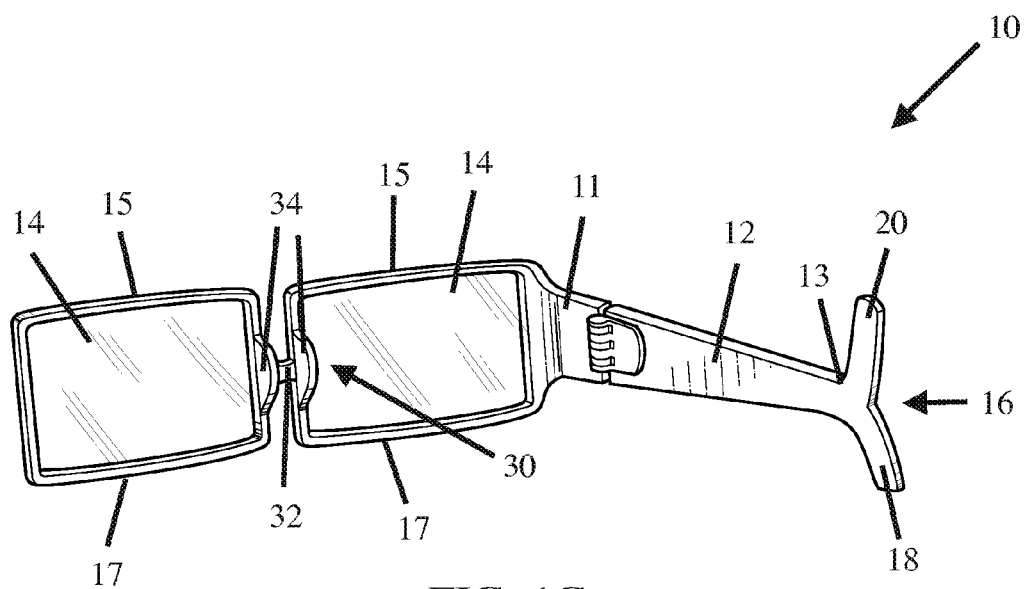
FIG. 1C illustrates a rear perspective view of the pair of reversible glasses of FIG. 1A in the first reading position.
Figure 1D:
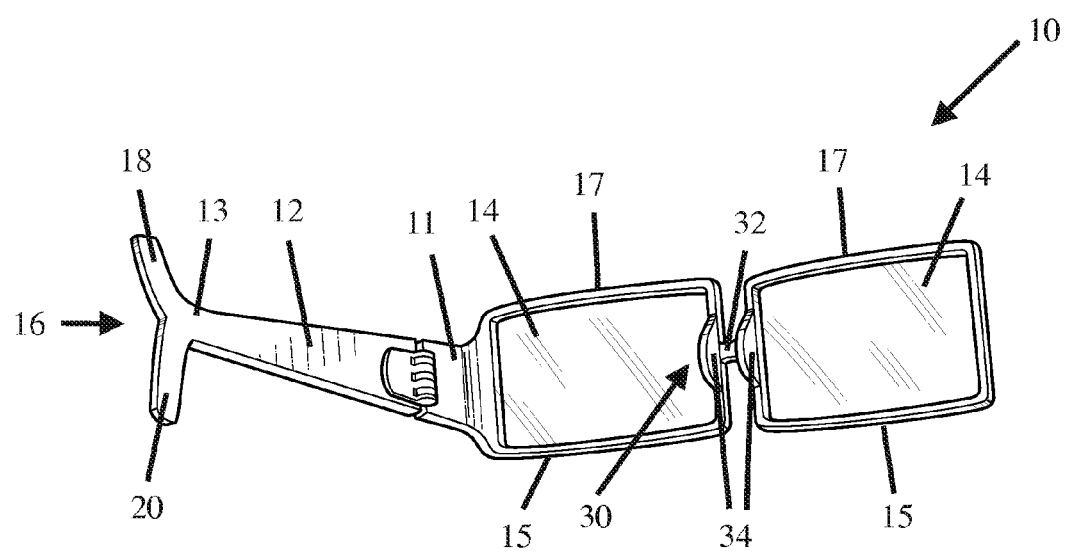

Referring to FIGS. 1C-1D, the one-stem reversible glasses further include a nosepiece 30 disposed between the two lenses 14. Unlike typical glasses, the nosepiece 30 is dimensioned and configured for receiving the nose of a user when the glasses 10 are rotated 180° between two positions (i.e., in either the first reading position as shown in FIG. 1C or the second reading position as shown in FIG. 1D). For example, the nosepiece 30 preferably includes a cross member 32 for securing the two lenses 14 together and resting on top of the user's nose that is positioned between a first end 15 and a second end 17 of the lenses 14 in a manner that permits the wearer of the glasses 10 to have sufficient space for their nose to be positioned below the cross member 32 and between the lenses 14 no matter which reading position the glasses 10 are being worn. In preferred embodiments, the cross member 32 is disposed a substantially equal distance between the first end 15 and the second end 17 of the lenses 14 as shown. Additionally, the nosepiece 30 preferably includes a set of nose pads 34 positioned with respect to the cross member 32 such that the nose pads 34 receive and cushion the user's nose in both reading positions. In particular, each nose pad 34 preferably extends above and below the cross member 32 as shown. Alternatively, two sets of nose pads 34 could be provided such that a first set of nose pads are positioned on one side of the cross member 32 adjacent the first end 15 of the lenses 14 for receiving and cushioning the user's nose in the first reading position and the second set of nose pads 34 are positioned on the other side of the cross member adjacent the second end 17 of the lenses 14 for receiving and cushioning the user's nose in the second reading position.

The above features make the glasses 10 reversible, giving the user the option of lying down on either side without an obtrusive stem getting in the way. For instance, if a person wants to lie down and read on their left side, he would put the glasses 10 on with the stem 12 along the right side of his face and the ear-piece 16 being secured to the right ear (i.e., the first reading position). If the user desires to change positions and lie on their right side, the user would simply remove and flip the glasses 10 over and put the glasses 10 on with the stem 12 along the left side of the face and the earpiece 16 being secured to the left ear. As described above, the earpiece 16 and nosepiece 30 are operable to accommodate either position. Further, the earpiece 16 and nosepiece 30 provide enough support such that the wearer may also use the glasses in either the first reading position or the second reading position when the user is in a steady upright position. In this regard, the stem 12 and associated earpiece 16 is relatively light as compared to the lenses 14 and the frame portion of the glasses that supports the lenses 14. Thus, due to the balanced nature of the lenses 14 while in an upright position, the earpiece 16 and nosepiece 30 provide sufficient support to the user to wear the glasses in an upright position, particularly when no sudden movements are being made such as when reading or watching television.

Other preferred features of the glasses 10 include the total width of the lenses being shorter than the width of a user's face such that the edges of the lenses do not extend so far beyond the focus area that they touch the pillow or other surface while lying down. Thus, the glasses could be provided in various sizes such as S/M or L/XL to accommodate smaller or larger face sizes. The rimless feature is also preferable because slight position changes of the wearer while lying down would still allow the wearer to view reading material without a frame obstructing the view. The one stem is preferably affixed to the lenses portion of the glasses 10 by a hinge as shown. Alternatively, because it is foreseen that the glasses will remain where the user watches television or reads, the glass frames may be molded into a unitary piece of material for additional rigidity.

In alternate embodiments, the glasses 10 may include two stems 12 similar to standard glasses. However, at least one of the stems 12 is operable to be either removed or folded such that user can wear the glasses in at least one of the reading positions with only one stem extending along the user's upward facing side of the face. In view of the above, it should be understood that "one stem" glasses refers to any pair of glasses that are operable to be configured to include only one stem that extends along a user's side of the face when desired. Thus, "one stem" glasses includes, for example, a pair of glasses permanently including only one stem, a pair of glasses where at least one stem is capable of being removed, a pair of glasses with at least one stem operable to be folded or telescopically retracted, etc.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. One stem reversible glasses comprising:
a first lens and a second lens;
one stem only having a proximal end and a distal end, the stem connected adjacent one of the first lens and the second lens at the proximal end;
an earpiece connected adjacent the distal end of the stem, the earpiece including means for securing the earpiece to a right ear of a user when the glasses are in a first reading position and for securing the earpiece to a left ear of the user when the glasses are in a second reading position; and
a nosepiece disposed between the first lens and the second lens dimensioned and configured for receiving a nose of a user when the glasses are in either the first reading position or the second reading position.

2. The glasses of claim 1 wherein the earpiece includes a first ear member and a second ear member both extending at least slightly vertically with respect to the stem in opposite directions whereby the first ear member is dimensioned and configured for securing the earpiece to the right ear of the user when the glasses are in the first reading position and the second ear member is dimensioned and configured for securing the earpiece to the left ear of the user when the glasses are in the second reading position.

3. The glasses of claim 1 wherein the earpiece includes a vertical member extending at least slightly vertically with respect to the stem and a rotating mechanism operable to move the vertical member between a first position for securing the vertical member to the right ear of the user when the glasses are in the first reading position and a second position for securing the vertical member to the left ear of the user when the glasses are in the second reading position.

4. The glasses of claim 1 wherein the nosepiece includes a cross member disposed a substantially equal distance between a first end and a second end of the first and second lenses.

5. The glasses of claim 4 wherein the nosepiece further includes a set of nose pads positioned with respect to the cross member such that the nose pads receive and cushion the nose of the user in both the first and second reading positions.

6. One stem reversible glasses comprising:
a first lens and a second lens;
one stem only having a proximal end and a distal end, the stem connected adjacent one of the first lens and the second lens at the proximal end;
an earpiece connected adjacent the distal end of the stem, the earpiece including a first ear member and a second ear member both extending at least slightly vertically with respect to the stem in opposite directions whereby the first ear member is dimensioned and configured for securing the earpiece to a right ear of the user when the glasses are in a first reading position and the second ear member is dimensioned and configured for securing the earpiece to a left ear of the user when the glasses are in a second reading position; and
a nosepiece disposed between the first lens and the second lens dimensioned and configured for receiving a nose of a user when the glasses are in either the first reading position or the second reading position.

7. The glasses of claim 6 wherein the nosepiece includes a cross member disposed a substantially equal distance between a first end and a second end of the first and second lenses.

8. The glasses of claim 7 wherein the nosepiece further includes a set of nose pads positioned with respect to the cross member such that the nose pads receive and cushion the nose of the user in both the first and second reading positions.

9. One stem reversible glasses comprising:
a first lens and a second lens;
one stem only having a proximal end and a distal end, the stem connected adjacent one of the first lens and the second lens at the proximal end;
an earpiece connected adjacent the distal end of the stem, the earpiece including a vertical member extending at least slightly vertically with respect to the stem and a rotating mechanism operable to move the vertical member between a first position for securing the vertical member to a right ear of the user when the glasses are in a first reading position and a second position for securing the vertical member to a left ear of the user when the glasses are in a second reading position; and
a nosepiece disposed between the first lens and the second lens dimensioned and configured for receiving a nose of a user when the glasses are in either the first reading position or the second reading position.

10. The glasses of claim 9 wherein the nosepiece includes a cross member disposed a substantially equal distance between a first end and a second end of the first and second lenses.

11. The glasses of claim 10 wherein the nosepiece further includes a set of nose pads positioned with respect to the cross member such that the nose pads receive and cushion the nose of the user in both the first and second reading positions.

* * * * *